March 6, 1962 J. C. GREENLEES 3,023,761
EXTERNALLY ADJUSTABLE SPEED CONTROLLER
Filed Sept. 17, 1958
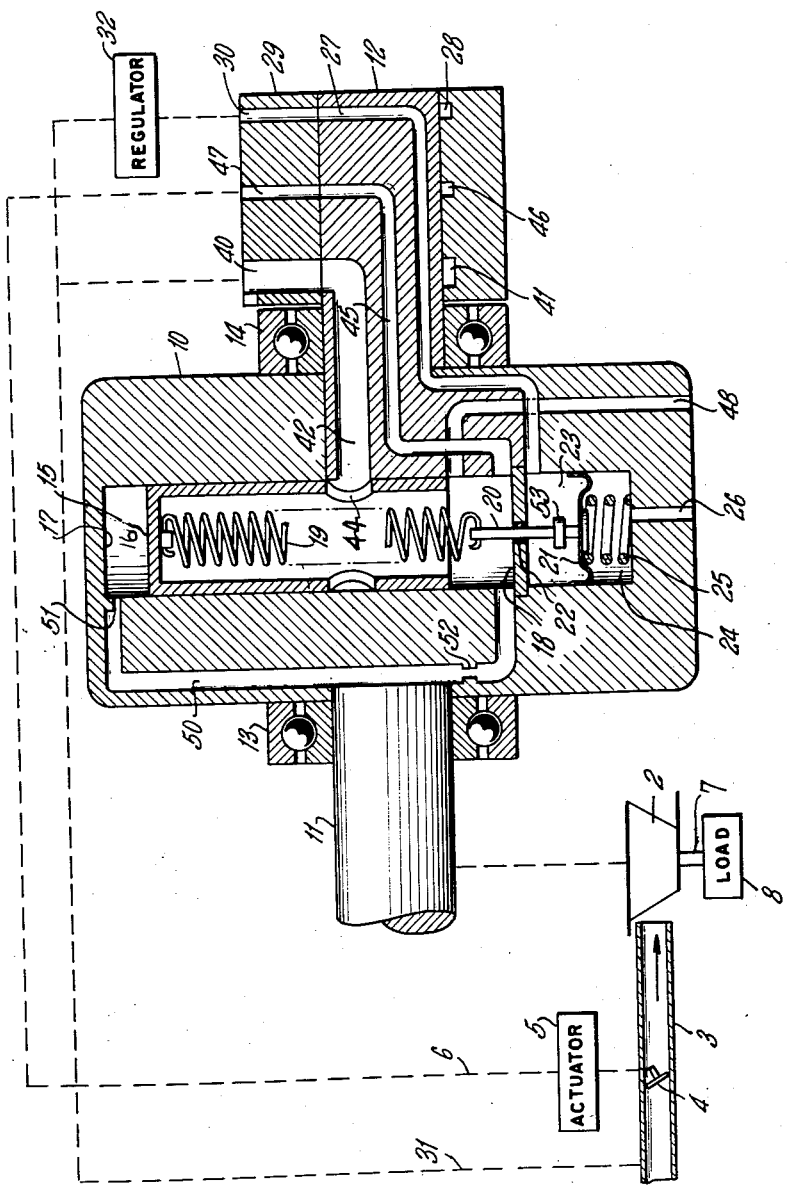
INVENTOR.
JAMES C. GREENLEES
BY
ATTORNEYS United States Patent Office 3,023,761
Patented Mar. 6, 1962

3,023,761
EXTERNALLY ADJUSTABLE SPEED
CONTROLLER
James C. Greenlees, Oakdale, N.Y., assignor to Fairchild
Stratos Corporation, a corporation of Maryland
Filed Sept. 17, 1958, Ser. No. 761,616
5 Claims. (Cl. 137—56)

This invention relates to speed responsive apparatus and, more particularly, to apparatus for controlling the speed of prime movers.

In a conventional speed control system for a prime mover, the speed of the prime mover is regulated by pressure controlled means which responds in a manner which is determined by the value of a control pressure. In systems of this type provision is made for sensing the speed of operation of the prime mover and for producing a variable control pressure which is a function of the speed of the prime mover. A speed control system of this general organization is applicable, by way of illustration, to a turbine in which the speed of rotation of the turbine is dependent upon the adjusted position of a throttle in a conduit conducting the impelling fluid to the turbine and in which the throttle is adapted to be regulated by a pressure controlled actuator.

The present invention provides a speed control device for speed control systems of this general organization. This speed control device includes a valve housing which is driven at a speed which is proportional to the speed of operation of the prime mover. The housing contains a slide valve piston therein which, as the speed of rotation increases, is urged further away from the axis of rotation of the housing, and as the speed of rotation decreases, is urged by resilient means toward the axis of rotation of the housing. This slide valve communicates with a source of fluid at a relatively high constant pressure and with a pressure controlled actuator which regulates the speed of the primer mover. Depending upon the adjusted position of the slide valve, a control pressure is transmitted to the actuator, which pressure is a function of the speed of rotation of the valve housing and the prime mover.

A particularly important feature of the present invention is the means for adjusting the speed control device for different ranges of speed. In many conventional speed control systems which operate on principles similar to the system for which the speed control device of the present invention is adapted, adjustments must be made internally of the speed control device. Such adjustments cannot ordinarily be made while the prime mover is in operation, unless provision is made for decoupling the speed control device from the prime mover. This disadvantage of conventional speed control systems is overcome in the present invention by providing within the valve housing a pressure controlled adjusting means for varying the force exerted on the slide valve in urging it toward the axis of rotation of the valve housing. This adjustment influences the speed of rotation of the valve housing at which the slide valve attains its position of equilibrium in controlling the speed of operation of the prime mover. Since means externally of the valve housing is provided for regulating the pressure of the fluid which controls the set point of the speed control device, this adjustment can be made even while the prime mover and valve housing are in operation.

For a more complete understanding of the invention, reference may be made to the following detailed description, taken in conjunction with the accompanying drawing in which the speed control device is shown in cross-section as a component of a speed control system which is illustrated schematically.

Referring to the drawing, there is shown a prime mover 2, for example a gas or air turbine, and a pressure control system therefor constructed in accordance with the present invention. The impelling gas is supplied at a high constant pressure to the prime mover through a conduit 3 containing a throttle valve 4 therein. The throttle valve is controlled by a conventional pressure controlled actuator 5. The position of adjustment of the throttle valve 4 is determined by the value of a control pressure supplied to the actuator 5 through a conduit 6. The main drive shaft 7 of the turbine is shown as coupled to a driven load 8.

Since the driven speed of the turbine is a function of the rate at which the impelling fluid is supplied to it through the conduit 3, the speed control system of the present invention is designed to control the flow of impelling fluid to the turbine by the regulation of the throttle valve 4. The adjusted position of the throttle valve 4, in turn, is controlled by the pressure controlled actuator 5 as a function of the value of the control pressure in the conduit 6.

The value of the control pressure in the conduit 6 is adapted to be varied in accordance with the speed of the prime mover by the speed control device to be described. The speed control device comprises a housing 10 rotatably supported by the shafts 11 and 12. The shaft 11 rotates in a bearing 13, and the shaft 12 rotates in a bearing 14. The shaft 11 is coupled by a drive transmission system to the main drive shaft 7 of the prime mover. Thus, the housing 10 is driven by the prime mover at a speed which is in direct proportion to the speed of the prime mover.

The housing contains a cylindrical bore 15 therein which passes through the axis of rotation of the housing 10. The bore 15 accommodates a slidable valve piston 16 therein. This valve piston is open at one end and closed at the other.

The ends of the cylindrical bore 15 are defined by an outer wall 17 which is remote from the axis of rotation of the housing and a wall 18 which is spaced closer to but on the opposite side of the axis of rotation of the housing. Thus, the valve piston 16 is offset from the axis of rotation of the housing and will normally be urged by centrifugal force toward the end wall 17. The valve piston, however, is urged in the opposite direction, that is to say, toward the wall 18, by a spring 19 which is affixed to the end of a movable rod 20. The opposite end of the rod 20 is affixed to a movable diaphragm 21, the position of which determines the magnitude of the force exerted by the spring 19. The rod 20 passes through an opening in the wall 18. Leakage of fluid through this opening is prevented by a seal 22 which surrounds the rod 20 but nevertheless permits axial adjustment of the rod under the control of the diaphragm 21. The rod 20 carries a stop 53 to limit the displacement of the rod 20 into the cylindrical bore 15.

The diaphragm 21 separates an inner chamber 23 from an outer chamber 24. The outer chamber 24 accommodates a compression spring 25 which acts against the diaphragm 21 to urge it toward the axis of rotation of the housing. The chamber 24 is vented to atmosphere by a vent passage 26. The chamber 23 is connected to a passage 27 which extends through the shaft 12. The extreme end of the passage 27 opposite the chamber 23 extends radially through the shaft 12 and communicates with a groove 28 formed in the inner surface of a stationary collar member 29. Thus, although the shaft 12 is rotating at high speed, it is at all times in communication with the groove 28. This groove 28, in turn, is connected to a conduit 30 which is in communication with a source of fluid whose pressure can be varied as desired. For example, the conduit 30 may be in communication with the supply pressure via a conduit 31 having a regulator 32 interposed therein. The regulator 32 permits the pressure within the chamber 23 to be varied to the value desired, thereby providing an external adjustment for the retaining means for the spring 19.

Fluid at a relatively high constant pressure is supplied to the housing 10 through a conduit 40 in the collar member 29. The conduit 40 communicates with a groove 41 which surrounds the shaft 12, and a passage 42 connects the groove 41 with the cylindrical bore 15. When the valve piston 16 is in a position such that the port 44 is partly or wholly aligned with the passage 42, the fluid is admitted into the portion of the cylindrical bore 15 between the closed end of the valve piston and the wall 18.

In this system it has been assumed that a relatively constant pressure is maintained in the conduit 3 upstream of the control valve 4 and that this pressure can be utilized as the source of constant pressure supplied to the conduit 40. If a restrictor is placed in the conduit 31, it will tend to minimize the effect of minor fluctuations in pressure. If, on the other hand, the conduit 3 upstream of the control valve 4 is subject to wide variation in pressure, it may be necessary to provide another source of constant pressure or provide means in the conduit 31 to maintain a relatively constant supply pressure to the conduit 40.

The end of the bore 15 immediately adjacent the wall 18 is connected by a passage 45 which extends into the shaft 12 and thence radially outwardly to communicate with a groove 46 in the inner surface of the collar member 29. The groove 46 communicates with the passage 47 which, in turn, communicates with the pressure controlled actuator 5 through the conduit 6. Thus, the pressure within the end of the cylindrical bore 15 adjacent the wall 18 is the control pressure which regulates the position of the throttle valve 4.

The control pressure supplied to the pressure controlled actuator 5 is determined by the rate of supply of fluid from the supply passage 42 and the rate of bleed of this fluid through a somewhat restricted vent passage 48. Both the rate of supply of fluid to, and the rate of bleed of fluid from, the cylindrical bore adjacent the wall 18 are determined by the position of the valve piston 16.

The height of the port 44 is approximately equal to or slightly larger than the sum of the heights of the passages 42 and 48. The distance between the lower edge of the port 44 and the lower end of the valve piston is equal to the distance between the lower end of the outlet from the passage 42 and the upper end of the inlet to the passage 48. In the position of equilibrium of the valve piston, the lower end of the piston is aligned with the upper end of the passage 48, and the lower edge of the port 44 is aligned with the lower end of the passage 42.

The position of the valve piston 16 shown in the drawing represents approximately the desired rate of speed of the turbine. The centrifugal force acting on the piston varies as the speed$^2$ of the prime mover. If the speed of the prime mover increases, thereby increasing the speed of rotation of the housing 10, the valve piston 16 tends to move outwardly. This, in turn, reduces the effective cross-sectional area of the port 44 which is in communication with the passage 42, thereby reducing the control pressure. The reduction in the control pressure, in turn, functions to adjust the throttle valve 4 toward closed position, reducing the speed of the turbine so that the valve piston 16 is restored to its initial position of equilibrium by the spring 19. On the other hand, if the speed of rotation of the prime mover is reduced below the desired value, the lower end of the valve piston partially closes the inlet to the passage 48. This, in turn, increases the back pressure within the valve piston, increasing the control pressure. This increase in control pressure is transmitted to the pressure controlled actuator 5 which, in turn, adjusts the throttle valve 4 toward open position to speed up the prime mover until the valve piston 16 is restored to its initial position of equilibrium.

The opposite ends of the cylindrical bore 15 are connected by a by-pass 50 containing restrictions 51 and 52 therein. This by-pass serves to prevent the control pressure from influencing the position of the valve piston and to dampen the piston motion in order to make the device insensitive to accelerations caused by torsional vibrations.

More specifically, the purpose of the restricted opening 51 is to provide a dash pot action. Many engine drives are rough and erratic, particularly in industrial applications. Therefore, erroneous speed signals are conveyed to the piston as a cycling signal. The final result of the cycling or undamped signal may be excessive wear or failure of the engine, linkages and/or governor. For this reason, we have included this feature in the governor.

The volume of the passage 50 intermediate the restrictions 51 and 52 allows the control signal under the piston to lead or lag the same control signal on the top of this piston. This phenomenon provides a temporary speed droop (i.e., speed decreases with load temporarily) which has a stabilizing effect on the control system. Ultimately, the pressure across the piston assumes approximately the same value and the system will operate isochronously until the next load or speed disturbance occurs.

As explained above, the diaphragm 21 serves as a means to vary the bias of the spring 19. The bias of the spring 19, in turn, influences the action of the spring by either assisting or retarding the movement of the mass of the valve piston. Thus, the pressure acting against the diaphragm 21 from the chamber 23 determines the preload or set point of the spring, and higher or lower preloads of the spring can be attained by regulating this pressure by adjustment of the regulator 32. Obviously, the position of equilibrium of the valve piston 16 will be determined by the preload of the spring, so that if the preload is higher, it will require a higher rate of speed of the housing 10 to reach the position of equilibrium. In this way, the speed control device of the present invention may be adjusted externally.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

I claim:
1. A speed control device comprising a rotatable housing, means for supplying to the rotatable housing a fluid at constant pressure, means for receiving from the rotatable housing a control fluid, the pressure of which is a function of the speed of rotation of the housing, a movable slide valve accommodated within the housing for movement toward or away from the axis of rotation of the housing as determined by the speed of rotation of the housing, means for exerting a force on said slide valve urging it toward the axis of rotation of the housing in opposition to the effect of centrifugal force on the slide valve, the position of equilibrium of the slide valve determining the magnitude of the pressure of the control fluid, a movable pressure-controlled actuator within the rotatable housing and connected to the movable slide valve through the means for exerting a force on said slide valve in a manner such that a movement of the actuator varies the force exerted on the slide valve, means establishing communication between a source of fluid and the movable pressure-controlled actuator, and means adjustable externally of the housing for varying the pressure of the fluid transmitted to the pressure-controlled actuator, thereby to vary the position of the actuator.

2. A speed control device comprising a rotatable valve housing adapted to be driven at a speed of rotation proportional to the speed to be controlled, a slide valve accommodated within a bore in the valve housing in a manner such that the center of gravity of the slide valve is maintained offset from the axis of rotation of the valve housing, means for supplying to the rotatable housing a fluid at constant pressure, means for withdrawing from the rotatable valve housing a fluid, the pressure of which is a function of the speed of rotation of the housing, a vent passage for discharging fluid from the valve housing, the position of said slide valve regulating the rate of flow of supply of fluid into the valve housing and the rate of discharge of fluid through the vent passage in a manner so as to determine the pressure of the control fluid, a spring exerting a force on said slide valve urging it toward the axis of rotation of the rotatable valve housing in opposition to the effect of centrifugal force on the slide valve, the position of equilibrium of the slide valve determining the magnitude of the pressure of the control fluid, a pressure controlled actuator connected to the spring for regulating the force exerted on the slide valve by the spring, said pressure controlled actuator being accommodated in the end of the bore opposite the direction of movement of the slide valve in response to increased speed of rotation of the housing, a passage for delivering a fluid at a regulated pressure to the pressure controlled actuator, and means externally of the valve housing for regulating the fluid pressure delivered to the pressure controlled actuator.

3. A speed control device as set forth in claim 2 including a partition in the bore separating the pressure controlled actuator and the slide valve, said partition maintaining the slide valve in position such that its center of gravity is offset from the axis of rotation of the housing, and means extending through said partition to connect the pressure controlled actuator and the spring.

4. A speed control device comprising a rotatable housing, means for supplying a fluid at relatively constant pressure to the rotatable housing, means for receiving a control fluid from the rotatable housing, the pressure of which is a function of the speed of rotation of the housing, means defining a bore within the rotatable housing, a movable slide valve accommodated within the bore for movement toward or away from the axis of rotation of the housing as determined by the speed of rotation of the housing, a spring for exerting a force on the slide valve urging it toward the axis of rotation of the housing in opposition to the effect of centrifugal force on the slide valve, a passage in the rotatable housing for supplying the fluid at relatively constant pressure to the bore, a vent passage communicating with the bore, a passage for the control fluid connecting the bore and the means for receiving the control fluid, the said slide valve controlling the flow of fluid from the supply passage through the bore to the vent and control fluid passages, whereby the position of equilibrium of the slide valve determines the magnitude of the pressure of the control fluid, a fluid pressure controlled actuator accommodated by the rotatable housing and connected to the movable slide valve, and means adjustable externally of the housing for varying the position of the actuator.

5. A speed control device as set forth in claim 4 including by-pass passage connecting the bore on opposite sides of the movable slide valve to prevent the fluid controlled by the slide valve from influencing the position of the slide valve.

References Cited in the file of this patent

UNITED STATES PATENTS

| | | |
|---|---|---|
| 862,867 | Eggleston | Aug. 6, 1907 |
| 1,185,317 | Herr | May 30, 1916 |
| 2,840,094 | Taplin | June 24, 1958 |
| 2,887,119 | Lee | May 19, 1959 |

FOREIGN PATENTS

| | | |
|---|---|---|
| 703,319 | Germany | Mar. 6, 1941 |